(No Model.) 2 Sheets—Sheet 1.
J. K. P. PINE.
METHOD OF MAKING CUFFS.
No. 371,096. Patented Oct. 4, 1887.
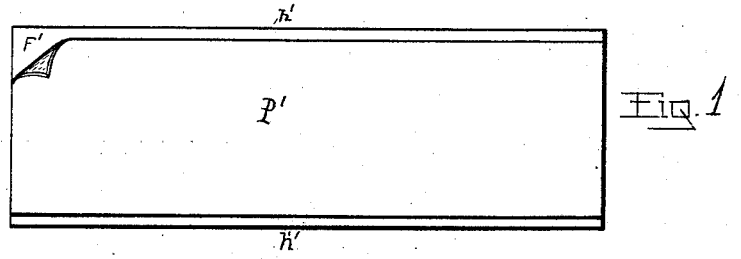
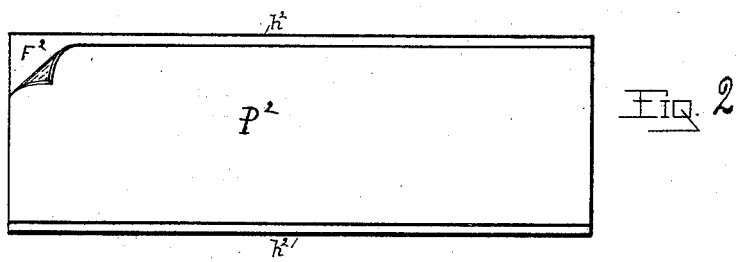
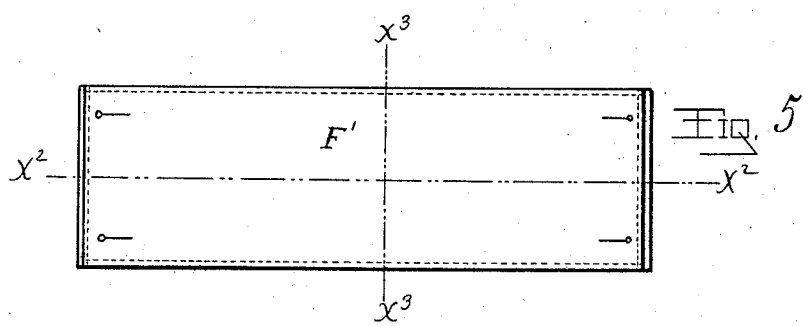
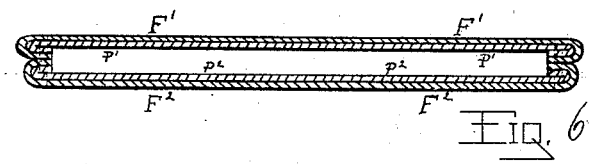
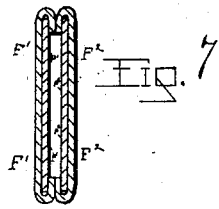
WITNESSES
Geo. A. Darby.
Charles S. Bumbrall.
INVENTOR
James K. P. Pine
by W. E. Hagan Atty (No Model.) 2 Sheets—Sheet 2.

J. K. P. PINE.
METHOD OF MAKING CUFFS.

No. 371,096. Patented Oct. 4, 1887.

WITNESSES
Geo. A. Darby.
Charles S. Brintnall

INVENTOR
James K. P. Pine
by W. E. Hagan
atty

UNITED STATES PATENT OFFICE.

JAMES K. P. PINE, OF LANSINGBURG, NEW YORK.

METHOD OF MAKING CUFFS.

SPECIFICATION forming part of Letters Patent No. 371,096, dated October 4, 1887.

Application filed February 14, 1887. Serial No. 227,559. (No model.)

*To all whom it may concern:*

Be it known that I, JAMES K. P. PINE, of the village of Lansingburg, county of Rensselaer, and State of New York, have invented a new and useful Improvement in Apparel-Cuffs, of which the following is a specification.

My invention has relation to improvements in apparel-cuffs; and my invention has for its object to simplify the making of the cuffs, the improvement of their finish, and their increased durability as regards wear.

My invention consists (as will be more fully described hereinafter in connection with its illustration) in the application of a thickness of the cuff facing and ply, cut to have the same length with the said facing, but enough wider than the ply to produce a hem fold in the sides of the facing, so as to include the side edges of ply without fold in the latter, and another thickness of facing and ply, cut enough longer than the before-named facing and ply to form a beaded subtending end edge in the cuff when the two sets of facings and ply are laid with their end edges parallel and sewed thereat, said last-named longer facing being also cut wide enough to form a hem fold in its side edges that will embrace the side edges of the longer ply without fold in the latter, with said parts connected to produce a cuff by laying one thickness of the facing and ply with the facing uppermost, then laying over that a thickness of facing and ply with the latter undermost and upon the other facing, then bringing the end edges of the several thicknesses of ply and facings together and parallel and sewing them thereat at a short distance from their ends, then turning them through the unsewed sides, then folding down the subtending edges of the longer facing, over the end edges of the shorter facing, and sewing the ends and the sides to complete the cuff and produce a finish.

Accompanying this specification, to form a part of it, there are two sheets of drawings, containing seven figures illustrating my invention, with the same designation of parts by letter-reference used in all of them.

Figure 3:
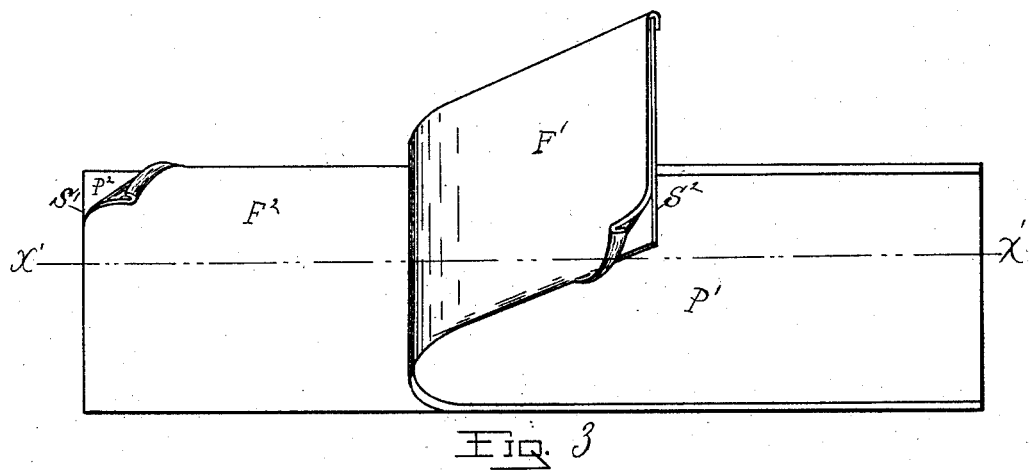
Figure 4:
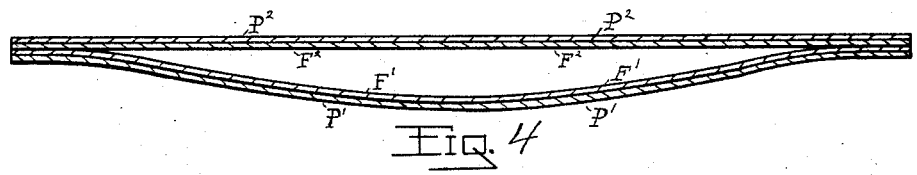

Of these illustrations, Figure 1 shows one of the exterior facings and a thickness of the ply on top thereof, with the former cut wider than the ply, so that its edge may be turned over and down on so as to include the side edge of the ply without fold in latter. Fig. 2 shows another one of the exterior facings, with a thickness of the ply laid thereon, with the facing cut enough wider than the ply to form a hem fold by turning its edge down over the edge of the ply without fold in the latter thereat, the facing and ply shown at Fig. 1 being cut a little longer than that shown at Fig. 2. Fig. 3 shows the two sets of facings and plies, indicated at Figs. 1 and 2, laid with the two facings together and a thickness of the ply above and below them. Fig. 4 shows a section taken longitudinally on the line $x'$ $x'$ of Fig. 3, illustrating the slack formed in the longer ply and facing by uniting the parts with their end edges parallel and before the parts have been turned. Fig. 5 shows the completed cuff; Fig. 6, a longitudinal section taken on the line $x^2$ $x^2$ of Fig. 5, and Fig. 7 a cross-section taken on the line $x^3$ $x^3$ of Fig. 5.

The several parts of the cuff are designated by letter-reference, and the several process-steps by which they are connected are described as follows:

The letter F' designates one of the facings, and P' one of the ply thicknesses, the facing thus designated being that which forms what is the exterior of the cuff when worn.

The letter $F^2$ designates another thickness of the exterior facing of the cuff and that which forms the body-surface of the latter when worn, and $P^2$ designates another thickness of the ply. The facing F' and the ply P' have the same length, with the facing cut enough wider than the ply to form a hem fold, $h'$, at each side that will when turned over and down include one of the side edges of said ply P' without fold in the latter. The facing $F^2$ and the ply $P^2$ have the same length, and the former is cut enough wider than the said ply to form a hem fold, $h^2$, at each side that will inclose the edge of the ply $P^2$ without fold in the latter. Both of the facings have the same width, and both of the plies have the same width.

The facing designated at F' and the ply P' have the same length and are both cut a little longer than the facing $F^2$ and ply $P^2$. The parts thus cut relatively as to size are connected as follows: The parts are laid as shown at Fig. 3, the two facings being together, with a thickness of ply above and below them, in which position their ends are brought together, so as to be parallel when they are sewed, as indicated at S' S². When this is done, the parts are turned through either one of the unsewed sides, so as to bring the facings to the outside. When this has been done, the slack formed in the outer facing is folded down at each of the ends, so that it forms in the outer facing a subtending beaded edge. When this has been done, the parts as thus placed are border-stitched to inclose the parts and form a finish.

I make no claim in this application for the hem-fold edges made in each side of each of the facings to receive without fold the side edges of one of the plies apart from the combination in which it is used herein, as said feature of cuff-making having been made the subject of claim in another application made by me and now pending, dated February 3, 1887, Serial No. 226,434.

Having thus described my invention, what I claim, and desire to secure by Letters Patent, is—

The method herein described of making and completing an apparel-cuff, which consists in sewing the ends of a longer facing and ply-blank to and even with the ends of a shorter facing and ply-blank, with the facing-blanks laid together, then turning the faces to the exterior, and then border-stitching the cuff with the ends of the longer blank extended beyond the ends of the shorter blank, as shown and specified.

Signed at Lansingburg, New York, this 9th day of February, 1887, and in the presence of the two witnesses whose names are hereto attached.

JAMES K. P. PINE.

Witnesses:
   J. A. STOVER,
   C. L. PINE.